(12) United States Patent
Konishi

(10) Patent No.: US 6,500,373 B1
(45) Date of Patent: Dec. 31, 2002

(54) MANUFACTURING METHOD OF FUSED MOLDED PRODUCT MAINLY COMPOSED OF VARIOUS PLASTICS

(76) Inventor: Masao Konishi, 1301, Nishinodai 2-chome, Chita-shi, Aichi 478-0055 (JP)

( * ) Notice: Subject to any disclaimer, the term of this patent is extended or adjusted under 35 U.S.C. 154(b) by 0 days.

(21) Appl. No.: 09/331,199

(22) Filed: Jun. 25, 1999

Related U.S. Application Data

(63) Continuation-in-part of application No. PCT/JP99/00767, filed on Feb. 22, 1999.

(30) Foreign Application Priority Data

Feb. 23, 1998 (WO) .............................. PCT/JP98/00741

(51) Int. Cl.⁷ ............................ B09B 3/00; B29B 17/00; B29C 43/02
(52) U.S. Cl. .................. 264/115; 264/116; 264/122; 264/913; 264/914; 264/920; 162/4
(58) Field of Search .................. 264/115, 116, 264/122, 913, 914, 920; 162/4

(56) References Cited

U.S. PATENT DOCUMENTS 5,075,057 A * 12/1991 Hoedl ........................ 264/115
5,164,132 A * 11/1992 Robeson et al. ......... 264/920 X
5,302,331 A * 4/1994 Jenkins ....................... 264/115

FOREIGN PATENT DOCUMENTS

| JP | 47-9340 | * | 5/1972 |
| JP | 60-109806 | * | 6/1985 |
| JP | 60-224506 | | 11/1985 |
| JP | 60-229709 | | 11/1985 |
| JP | 5-192927 | * | 8/1993 |
| JP | 6-220724 | | 8/1994 |
| JP | 7-205149 | * | 8/1995 |
| JP | 8-290409 | | 11/1996 |
| JP | 9-001513 | | 1/1997 |
| JP | 9-019907 | | 1/1997 |
| JP | 9-49118 | * | 2/1997 |
| JP | 9-095556 | | 4/1997 |
| JP | 9-150407 | | 6/1997 |
| JP | 9-220709 | | 9/1997 |

* cited by examiner

Primary Examiner—Leo B. Tentoni
(74) Attorney, Agent, or Firm—Arent Fox Kintner Plotkin & Kahn, PLLC

(57) ABSTRACT

Fibers obtained by opening waste plastics of different kinds and fibers obtained by opening wastepaper are mutually woven, and molded under heat and pressure. As a result, different kinds of waste plastics can be recycled without requiring separation or classification.

13 Claims, 4 Drawing Sheets

US 6,500,373 B1

MANUFACTURING METHOD OF FUSED MOLDED PRODUCT MAINLY COMPOSED OF VARIOUS PLASTICS

This application is a Continuation-in-Part Application of International Application No. PCT/JP99/00767 filed on Feb. 22, 1999.

TECHNICAL FIELD

The invention relates to a method of manufacturing a molded product of multiple-component mainly composed of waste plastics or wastepaper, and presents a method of recycling materials without having to classify waste plastics. For example, by processing into a material board, a panel usable as substitute for building material or civil engineering material is presented.

BACKGROUND ART

Industrial waste and domestic waste were once products made of various materials such as plastics, and for recycling of resources, it is required to separate and classify the materials, and single materials being separated and classified are collected as recycled resources. In particular, plastic materials have problems of specificity as high molecular binders, and it has been considered impossible to mix different materials, and fuse and mold again according to the theory of compatibility, and if fused and molded, the required strength as product could not be obtained sufficiently.

For example, in the case of recycling of PET bottles, the main body resin is integrally molded of polyethylene terephthalate resin (PET resin), but the label area is made of polystyrene resin (PS) in consideration of printability. The cap is made of polypropylene resin (PP) in consideration of moldability, and the PET bottles made of three materials are separated and classified, and the PET resin of the main body is processed into fibers, and used in weaving of carpets, working clothes, etc. at the present.

Waste plastics from automotive parts are treated for oiliness, and recycled as the liner of automobile carpets or undercoating agent for the bottom of the car body in the factories of, the major automakers at the present, but it is not intended to recycle waste plastics discharged in the general market, and examples of recycling into building materials in a different market are not known yet.

Moreover, building plywoods were mainly wood bonds using tropical woods, and products were mainly composed of wood materials and wood pieces such as veneer, plywood, particle board, fiberboard, wood piece cement board, and gypsum particle board, and conifer woods are pressed and adhered by using adhesive as in particle board and fiberboard at the present. For example, as disclosed in Japanese Laid-open Patent No. 8-93217, resin plywoods made of rigid urethane resin are also developed, but they are also integrally molded by extrusion by laminate fusing method of injection molding method by adhering resin sheets, and the resin materials used therein are only single resins which are used by fusing and molding.

Although effective utilization of resources is requested, the recycling rate of waste plastics is only 2.9%, or 260,000 tons a year (1996). The rest is processed by methods causing to produce carbon dioxide such as use as fuel or incineration. The recycling rate of wastepaper is 53.5% (15 million tons), and this rate is not improved for several years.

The problem is that recycling requires separation and classification of waste matter composed of various materials, and the present processing method is limited for recycling as single materials. Concerning waste plastics, 300 to 1000 kinds of plastic resins are distributed in market, and once released into the market, it is nearly impossible to identify the materials in most resins.

Plastics are also called high molecular binders, and high polymers of different kinds are not miscible in the molecular order like water and oil. For example, polystyrene and polypropylene are similar in structural formula, but are not compatible. Thus being composed of multiple different molecular bonds, it is impossible to disperse different materials in the monomer units, and fuse mutually and mold again according to the theory of compatibility. If fused and molded, it is extremely difficult to satisfy the physical strength required in the product.

It is hence an object of the invention to present a method of manufacturing molded products by using waste plastics, wastepaper, wood pieces and others commonly, without sorting out from the refuse, by solving the problems mentioned above, and to present molded products of light weight for volume and having a sufficient strength at low cost by such method.

SUMMARY OF THE INVENTION

Plastic materials composed of noncompatible different polymers are formed into cellulose in sledge form to obtain cotton-like polymers, and mutually woven cellulose fibers are fused under heat and pressure, so that noncompatible different polymers can be integrally kneaded and molded. Herein, this molding method is called the cellulose molding method.

As different fibers in sledge form are woven together, high molecular meshes of different kinds are formed, and noncompatible different resins are used and molded again, and if aggregation begins due to temperature changes, since plastic fibers in compatible relation are woven together, peeling phenomenon can be avoided.

Further, by opening wastepaper, wood pieces and others, fibers having molecular skeleton containing cellulose, hemicellulose, lignin and others can be obtained.

Such fine fibers and plastic fibers are mutually woven and fused, and lignin is eluted to permeate into gaps of microphase separation of plastic fibers, so that an integral molded product is composed. Further, the cellulose failing to elute is mixed into the molded product as cellulose fibers, so that the physical strength may be satisfied.

Considering recycling of waste plastics, hitherto, it was general to grind plastics into fine pieces and fuse. High molecules of different kinds are not mutually fused in he molecular order like water and oil. For example, polystyrene and polypropylene are similar in structural formula, but are not compatible. Such fusible relation of plastics is generally understood as compatible relation or noncompatible relation. If fused, however, it is extremely difficult to satisfy the strength and other physical properties required in the product. FIG. 4A and/or FIG. 4B shows a sample of fusing and molding different resins. In this case, using a biaxial extruder, polystyrene (outside) and polypropylene (inside) are extruded and spun, and the fusing temperature was 220 deg. C. in polystyrene and 180 deg. C. in polypropylene. The discharge was 2.4 cc/cycle, and interface tension was 5.1 mN/m. In the diagram, the polystyrene phase and polypropylene phase form an independent layer individually without being fused together. independent layer individually without being fused together.

On the other hand, known as polymer alloy, plastic materials are widely modified as new materials by mixing various components. Many practical examples are known. For example, the ABS resin widely used in automotive parts is known as a representative polymer alloy by copolymerization of polystyrene with butadiene or styrene. However, the forming method of polymer alloy is generally a chemical bond processing in a chemical plant, such as graft copolymerization or block copolymerization, and it is possible only by specifying the raw materials in both quality and quantity, and further using a solvent, and therefore in the case of waste plastics, if the quality and quantity of raw materials cannot be specified, it is difficult to obtain a product (molded product) satisfying the required quality, strength and other properties.

As other method, when different materials are fused and kneaded mechanically and by force, using an extruder or the like, a two-phase sea-island structure in emulsion form (see FIG. 5a, FIG. 5b, FIG. 5C and/or FIG. 5d.) is obtained, and it can be cooled and solidified, but since the surface tension between high molecules is small, as the noncompatible plastic resin aggregates by temperature change, phase separation begins, and peeling phenomenon may occur (note also page 10).

By such method, a fused product may be obtained by mixing different materials, but since the quality, quantity and properties of waste plastics cannot be determined, and hence the solvent cannot be specified, so that a perfect polymer alloy cannot be formed, and it was difficult to recycle the refuse.

According to the cellulose forming method of the invention, by forming plastic materials composed of noncompatible different polymers into cellulose in thread form, linear polymers are obtained, and by kneading fibers made of different materials, different types of high molecular meshes are formed, and the mutually woven cellulose fibers are fused under heat and pressure, so that noncompatible different polymers are integrally kneaded to form into a desired shape (see FIG. 3). By mutually weaving different fibers in thread form, different types of high molecular meshes are formed, and microphase separation phenomenon recurs, but by maintaining the physical composition and forming multi-phase material constitution, it was found that the rigidity superior to that of single material can be obtained.

Moreover, by physically opening wastepaper, wood pieces and others, fibers having molecular skeleton containing cellulose, hemicellulose, lignin and others can be obtained. When such fine fibers and plastic fibers are mutually woven and fused, and lignin is eluted to permeate into gaps of microphase separation of plastic fibers, so that an integral molded product is composed. Further, the cellulose failing to elute is mixed into the molded product as cellulose fibers, so that the physical strength may be satisfied.

When plastic fibers formed by fusing and spinning plastics in sledge form and fibers obtained by opening wastepaper, wood pieces and others are fused under heat and pressure, a crosslinking effect is brought about in the microphase separation situation of waste plastics in noncompatible relation, so that a material board having properties similar to those of wood can be obtained from the refuse.

Since the molded product of the invention is mainly composed of waste matter such as waste plastics and wastepaper, it is low in cost and excellent in processability. In particular, by mixing wastepaper, aside from waste plastics, the molded product is light in weight for its volume. Having the characteristics of thermoplastic resin, peeling performance from concrete is excellent, and the water resisting effect is sufficient. Moreover, as required, coloring pigment, antistatic agent, foaming agent (for reducing weight), magnetic powder (for shielding effect of electromagnetic waves), and others may be fused together, so that it can be used as substitute for building plywood or the like.

According to the invention, as refuse processing and recycling method, using waste plastics and wastepaper as principal materials, a molding method of low cost, specific strength and excellent processability may be presented, and by effectively utilizing waste plastics and waste paper, it also contributes to the industrial waste problem and environmental problem.

Further, by using the molded product of the invention as a substitute for plywood for building or civil engineering, since wood is not used in the material as in the conventional plywood, the present problem of forest protection may be partly solved. It is preferable, for example, as the substitute for plywood for concrete forms. By employing the cellulose forming technology of the invention, wastepaper can be mixed and fused into waste plastics, and a material board similar to plywood can be recycled from the refuse.

Referring now to the drawings, an embodiment of the invention is described below.

BRIEF DESCRIPTION OF THE INVENTION

BEST MODE OF CARRYING OUT THE INVENTION

Figure 1:
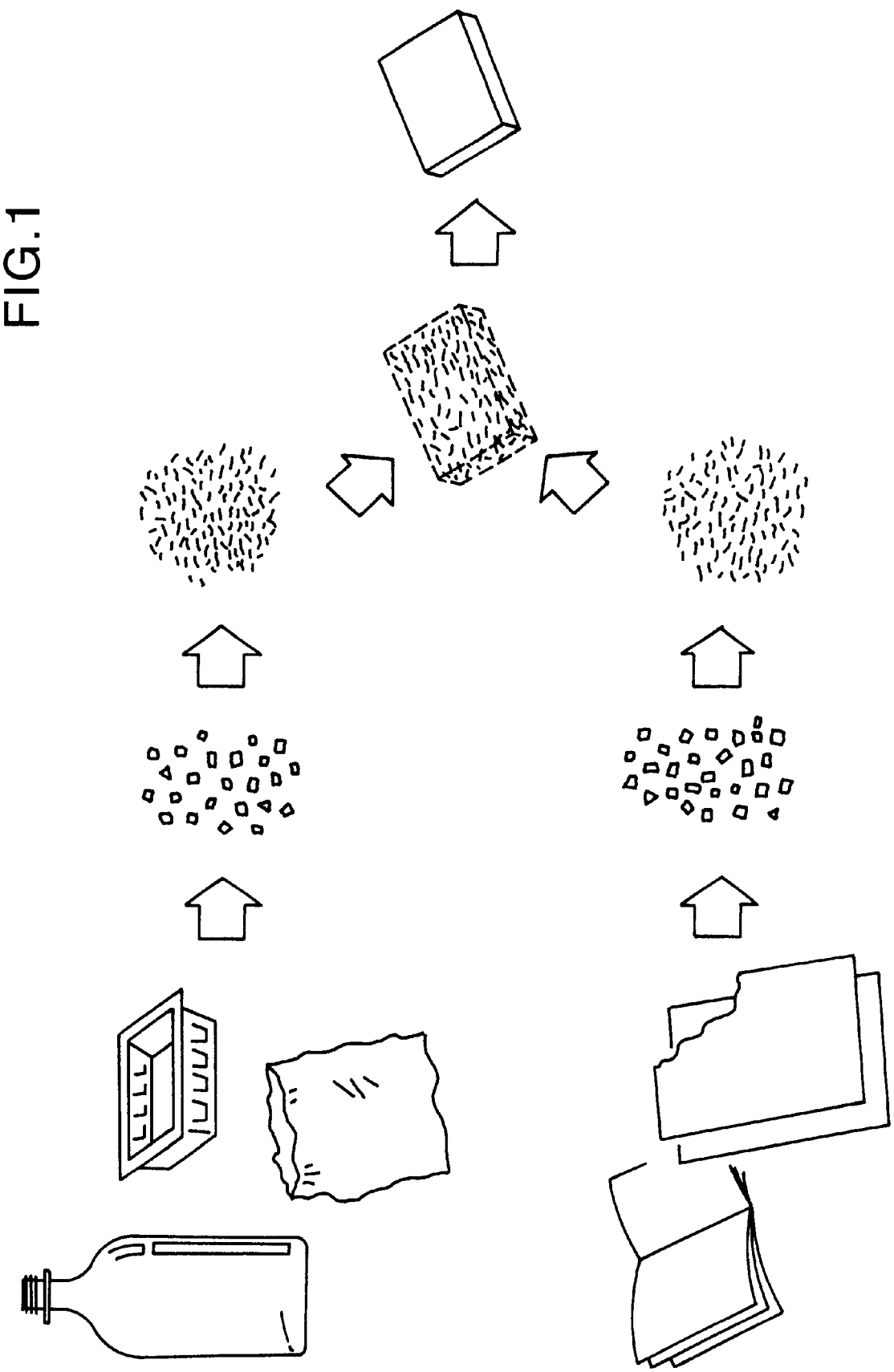
FIG. 1 is a conceptual diagram of cellulose forming method according to the invention.

First, a cellulose forming method of the invention is described below. As schematically shown in FIG. 1, using waste plastics and wastepaper as principal materials, these constituent materials are ground into nearly uniform size, opened, blended, and molded under heat and pressure.

Herein, usable waste plastics may include polyethylene (PE), polypropylene (PP), polymethyl methacrylate (PMMA), AS resin (AS), ABS resin (ABS), polycarbonate (PC), polyamide (PA), polyoxymethylene (POM), polyphenylene oxide (PPO), polyvinyl acetate, and other thermoplastic resins, but it is not intended to limit to these resins alone as far as the resins can be molded under heat and pressure. It is also possible to blend two or more polymers to obtain thermocompression molded product. Incidentally, polyvinyl chloride is regarded to have a problem because harmful gas is released during incineration process, but since the molded product of the invention can be recycled semipermanently without being burned, polyvinyl chloride can be also used.

As for wastepaper, weekly magazines, newspapers, corrugated cardboard, and business forms are representative examples, and also wood chips having wood fibers, palm shell fibers, and any other material having fibers and fibrous layers may be used. In that sense, used clothes and cloth pieces containing cotton, hemp, and synthetic fibers may be also used. Therefore, the term "wastepaper" herein includes all of them. Depending on the blend and considering the strength of molded product, it can be sufficiently used as substitute for building material for wall or ceiling.

In addition to the principal materials mentioned above, foaming agent, antistatic agent, coloring pigment, glass fiber and others may be properly added, and various characteristics depending on the additives may be given to the molded product, and improvement of quality of molded product is expected. For example, glass and other industrial refuse may be fused and blended in fibrous form, and the strength of obtained molded product may be enhanced. By mixing magnetic powder, for example, the merchandise may be developed as anti-magnetic panel. Thus, the cellulose forming method is characterized by ease of mixing of different materials.

Figure 2:
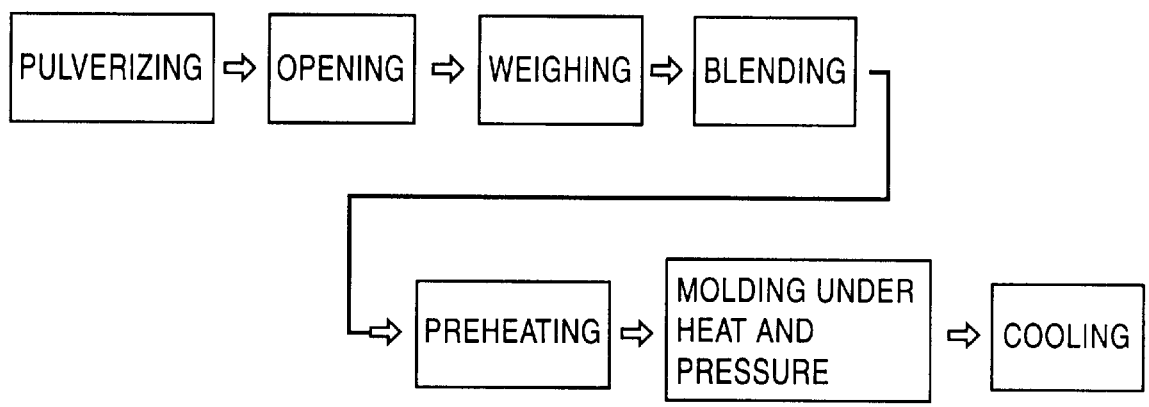
FIG. 2 is a block diagram showing the process of cellulose forming method of the invention.
Figure 3:
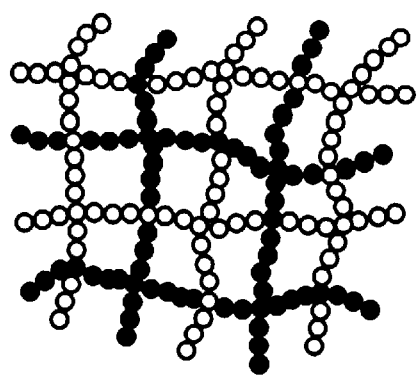
FIG. 3 is a schematic diagram of different types of high molecular meshes.
Figure 4A:
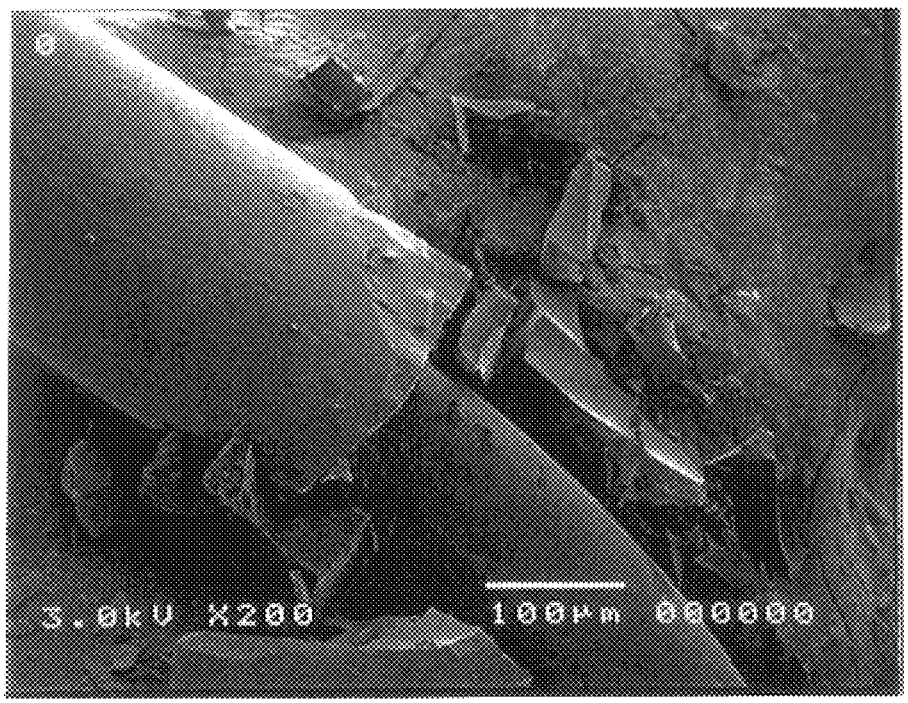
FIG. 4A is a side view of a sample obtained by extruding and spinning different resins.
Figure 4B:
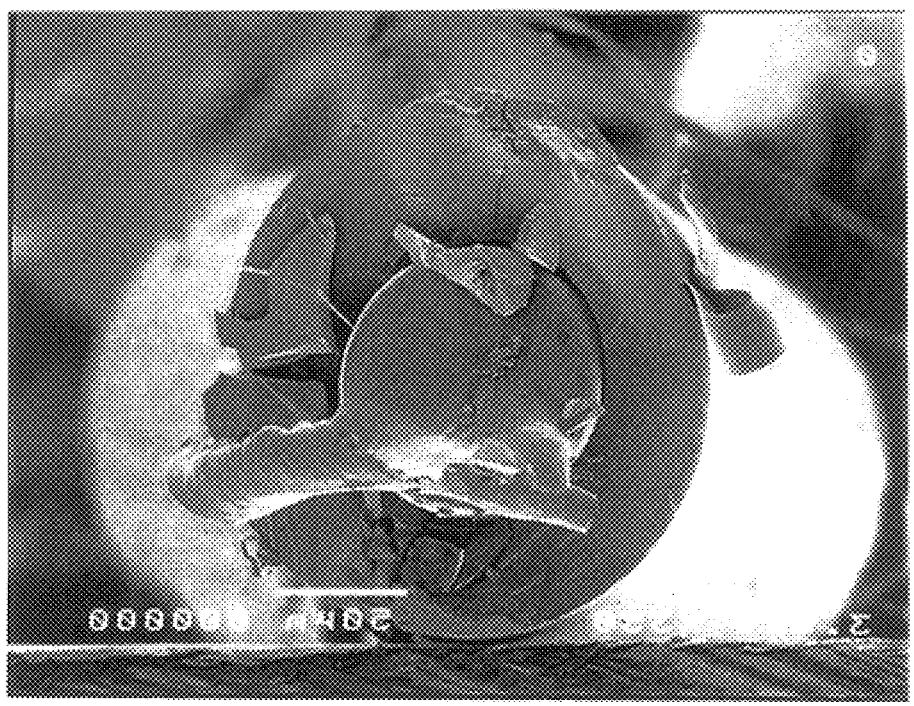
FIG. 4B is a cut-away side view of the sample in FIG. 4A.
Figure 5A:
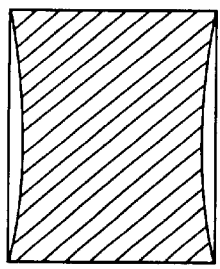
FIG. 5 is a phase diagram of high molecular mixed system.
Figure 5B:
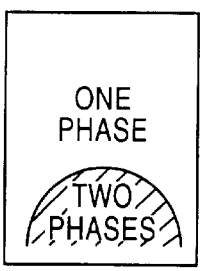
Figure 5C:
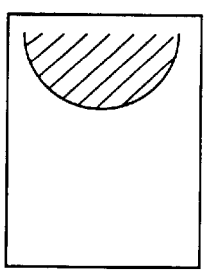
Figure 5D:
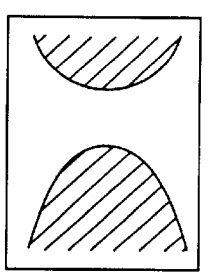
Figure 6:
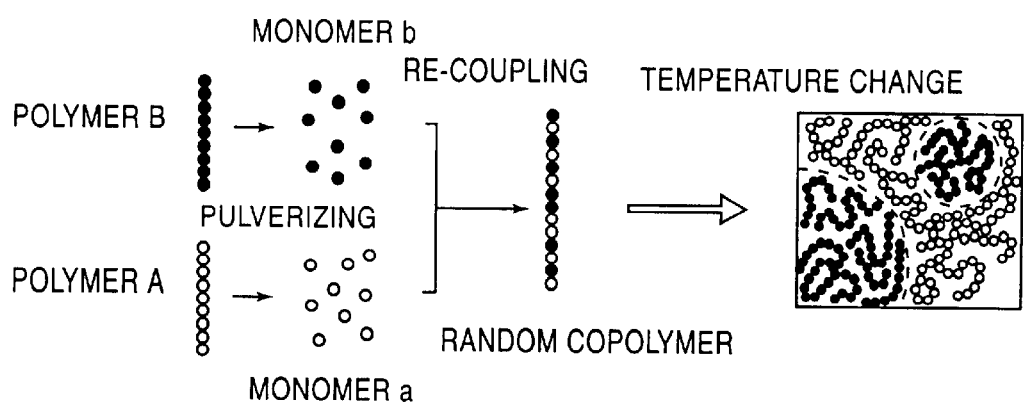
FIG. 6 is an explanatory diagram of theory of compatibility.

A representative process of cellulose molding method is shown in flow sheet in FIG. 2. The process from charging of material till weighing and blending may be done in separate lines for waste plastics and wastepaper among the principal materials.

Of the process shown in FIG. 2, representative steps are described below.

Pulverizing Step

Integrally formed principal materials (plastic containers, PET bottles, bags, others, and their torn pieces) are pulverized into a uniform size. The size of crushed pieces is preferred to be in a range of about 1 cm square to 8 cm square. The shape is not specified. The pulverizing step is a preparatory step before opening step, and by crushing principal materials, it is easier to detect and remove foreign matter (metal, pebbles, glass).

Fusing and Spinning Step (Waste Plastics)

By spinning waste plastic materials mainly composed of pulverized materials by an extrusion spinning machine, fibers of about $1\mu$ to 2 mm in diameter can be formed, and herein the largest merit of the cellulose forming method is that it does not require continuous fibers, which was a problem in the conventional method, in the recycle fiber process for obtaining fibers for carpet or the like, and therefore by kneading different resins by the extruder without separation or classification, ultrafine and short fibers are obtained. Specifically, fibers of 5 to $20\mu$ in diameter and 5 to 15 mm in length are obtained.

In other method, by applying a centrifugal force action to plastic resins fused in gel form, a spun filament may be also obtained, but herein, the extruder is used as a step for obtaining representative fibers.

Opening Step (Waste Paper)

Pulverized paper and wood pieces are provided with extrusion force and rotational force, and fibers of $1\mu$ to 1 mm in diameter and 3 to 20 mm in length are obtained.

In the treating method in other recycling process, processing and mixing into pulverization may be general, but in this cellulose forming method, short fibers are used for reinforcing the physical strength of the high molecular binders, and the fiber conditions may be set depending on the required physical strength of the product, but specifically fibers of 2 to $5\mu$ in diameter and 1 to 15 mm in length are obtained.

Weighing Step

A blending rate of general fibers for molding a building panel (900×1800×12, unit: mm) is given in Table 1. Of course, the actual blending rate should be determined depending on the strength, reduction of weight, location of use of building material, and other specification.

TABLE 1

| Fibers from waste plastics | 9 kg |
|---|---|
| Fibers from wastepaper | 9 kg |
| Total | 18 kg |

Mixing, Drying Step

By fusing and spinning waste plastics, short fibers of 5 to $20\mu$ in diameter and 5 to 15 mm in length are obtained, and by opening wastepaper, short fibers of 2 to $5\mu$ in diameter and 5 to 15 mm in length are obtained, and they are dried to water content of about 3 to 8%, and by stirring the fibers mutually by convection, they can be uniformly mixed.

Preheating Step

As an example of molded product, when manufacturing plywood for building, since the production quantity is extremely large, preheating is done in order to shorten the pressing time required for thermocompression molding. By preheating the spun opened fibers at proper temperature and fusing individual fibers, properties and density close to those of wood are obtained. The heating means may include external heating such as hot air or infrared ray, and direct heating such as corona discharge. The preheating temperature is specifically 50 to 180° C., and preferably 60 to 120° C.

Thermocompression Molding Step

After fusing various fibers in the preheating step, they are compressed to desired molding size by thermocompression molding step, and the material surface is further melted at the same time. After molding under heat and pressure, as required, the paper, wood and resin may be coated with film, or the surface may be painted, so that the commercial quality of product may be enhanced. Examples of treating conditions in the thermocompression molding are given in Table 2.

TABLE 2

| Temperature (° C.) | 130 to 380 |
|---|---|
| Pressure (kg/cm$^2$) | 30 to 80 |
| Time (minutes) | 1 to 3 |

Industrial Applicability

By the cellulose molding method of the invention, panels used as concrete forms were manufactured. The product is a panel of which shape and standard dimensions (mm) are 900 in width, 1800 in length, and 12 in thickness.

Dynamic characteristics of panel, durability of weir plate, processability of forms, and installation of forms were tested. Results are shown in Tables 3 to 6.

The dynamic characteristics of panel were evaluated by rigidity and bending strength. The rigidity was measured according to JIS A 8652 (Metal Panels for Concrete Form), and the bending strength was determined by bending strength test.

TABLE 3

| Rigidity | 57.1 kN (max. load) |
|---|---|
| Bending strength | 8.6 kN-m |

The durability of weir plate was tested and verified by water absorption rate (JIS A 5905 Insulation Fiberboards), expansion rate test of thickness by absorption of water (JIS A 5905 Insulation Fiberboards), bending strength test in wetting (conforming to JIS A 5905 Insulation Fiberboards), and alkali resistance test (Japan Agricultural Standard on Plywood for Concrete Form).

TABLE 4

| Water absorption rate | 1.6% |
| --- | --- |
| Thickness expansion rate by water absorption | 0.7% |
| Bending strength | 19.8 N/mm |
| Alkali resistance | No change except for slight discoloration |

The processability of form was evaluated by nail pulling durability test and investigation of cutting and drilling time. In the former, nails (N45) were driven vertically to the panel by ½ of length, and maximum pulling durability was measured. In the latter, products were cut and drilled by using circular saw and power drill.

TABLE 5

| Nail pulling durability | 139 N |
| --- | --- |
| Cutting time | 15 sec |
| Drilling time | 4 sec |

To evaluate the installation of form, the field investigation and finish investigation were done. In the former, same tools as used in plywood forms were used in the field to investigate. In the latter, by pouring concrete into panels of embodiment, and forms were removed after 7 days, and the concrete surface was investigated.

TABLE 6

| Assembling and disassembling tools | Same tools as in plywood forms |
| --- | --- |
| Repulsion of concrete surface | 32.3 N |
| Smoothness of concrete surface | Equivalent smoothness |

As clear from these results, the embodiment was proved to be equivalent to the conventional wooden plywood in its strength, processability and installation, as the substitute for plywood for concrete form. Besides, it was confirmed that the molded product corresponding to the required physical strength can be obtained by controlling the mixing rate of wastepaper and waste plastics, and by recycling the "refuse" such as waste plastics and wastepaper as the plywood for building that is required in a huge quantity, it contributes greatly not only to the environmental problem of disposal of waste, but also to protection of forest resources.

What is claimed is:

1. A manufacturing method for forming a fused, cellulose and plastic, molded product said method comprising the steps of:

a) pulverizing without separating or classifying, waste, plastic materials for obtaining a pulverized waste plastic material;

b) melt drawing or melt spinning the pulverized waste, plastic material for obtaining plastic fibers;

c) pulverizing vegetable or fibrous waste for obtaining cellulose fibers;

d) blending the plastic fibers and the cellulose fibers for obtaining a fiber mixture;

e) preheating the fiber mixture to reduce the water content; and f) molding the fiber mixture by thermocompression molding for obtaining the fused, cellulose and plastic, molded product.

2. The manufacturing method of claim 1, wherein the waste, plastic materials are at least one of polyethylene, polystyrene, polyvinylchloride, polyethylene terephthalate, polymethyl methacrylate, AS resin, ABS resin, polycarbonate, polyamide, polyoxymethylene, polyphenyl oxide, polyvinyl acetate or other thermoplastic resin.

3. The manufacturing method of claim 1, wherein the resin materials are formed into fibers to form high molecular meshes, containing incompatible polymers.

4. The manufacturing method of claim 1, 2 or 3, wherein the plastic fibers and cellulose fibers are cross-linked.

5. The manufacturing method of claim 4, wherein the resin is fused under sufficient heat and pressure for obtaining a rigidity of 57.1 kN and a bending strength of 8.6 kN-m.

6. The manufacturing method of claim 4, comprising eluting lignin from the paper and wood pieces by heating and fusing, wherein the lignin permeates into gaps of microphase separation of the plastics for obtaining an integrally molded product.

7. A method for forming a fused molded product, comprising:

a) pulverizing waste, plastic materials for obtaining a pulverized waste plastic material;

b) spinning the pulverized waste, plastic material for obtaining plastic fibers;

c) blending the plastic fibers for obtaining a fiber mixture in which the plastic fibers intertwine with each other; and d) molding the fiber mixture by thermocompression molding for obtaining the fused, plastic molded product.

8. The method of claim 7, wherein the waste, plastic materials are at least one of polyethylene, polystyrene, polyvinylchloride, polyethylene terephthalate, polymethyl methacrylate, AS resin, ABS resin, polycarbonate, polyamide, polyoxymethylene, polyphenyl oxide, polyvinyl acetate or other thermoplastic resin.

9. The method of claim 7, where the plastic materials are formed into fibers to form high molecular meshes, containing incompatible polymers.

10. The method of claim 7, further comprising pulverizing waste paper and wood pieces for obtaining cellulose fibers, and blending the cellulose fibers with the plastic fibers of step c).

11. The method of claim 10, wherein the plastic fibers and cellulose fibers are cross-linked.

12. The method of claim 10, wherein the cellulose fibers and the plastic fibers are fused under sufficient heat and pressure for obtaining a rigidty of 57.1 kN and a bending strength of 8.6 kN-m.

13. The method of claim 10, comprising eluting lignin from the waste paper and wood pieces by heating and fusing, wherein the lignin permeates into gaps of microphase separation of the plastics for obtaining an integrally molded product.

* * * * *